Jan. 9, 1923.
T. H. JOHNSTON.
FUEL CHARGE VAPORIZER FOR INTERNAL COMBUSTION ENGINES.
FILED AUG. 23, 1918.
1,441,809.
2 SHEETS—SHEET 1.
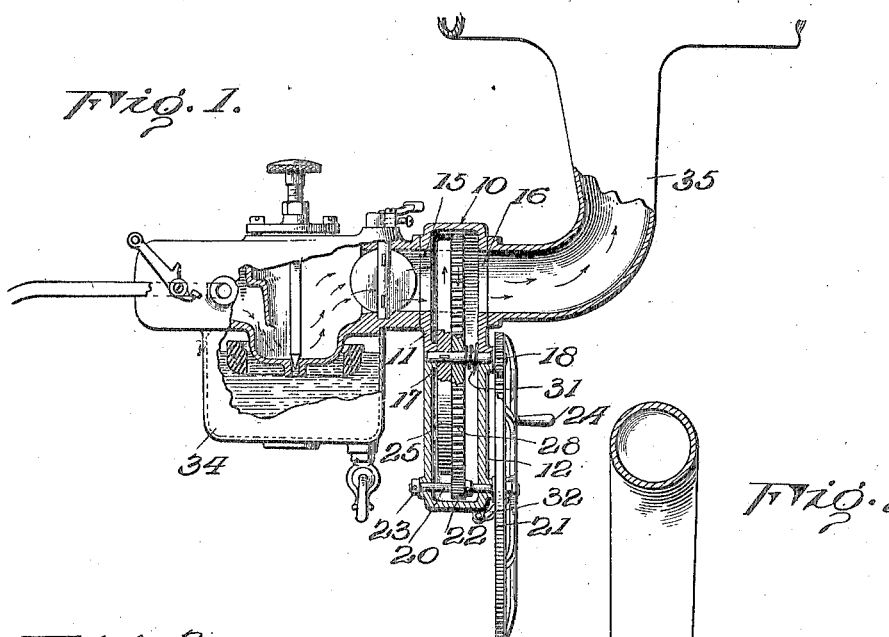
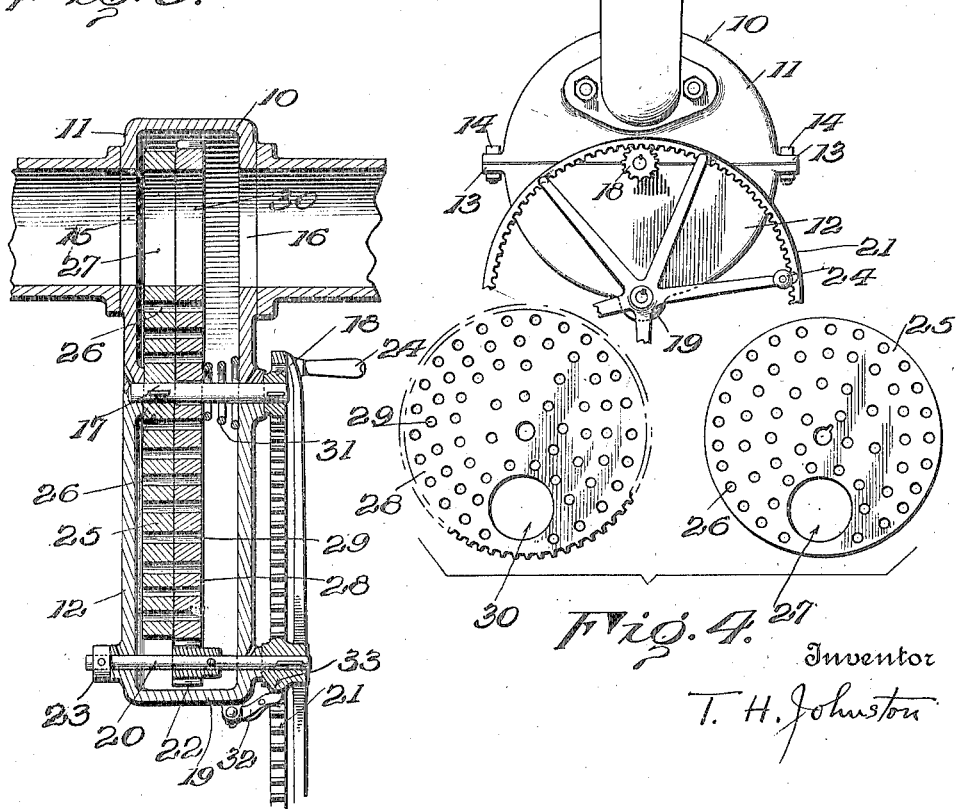
Inventor
T. H. Johnston

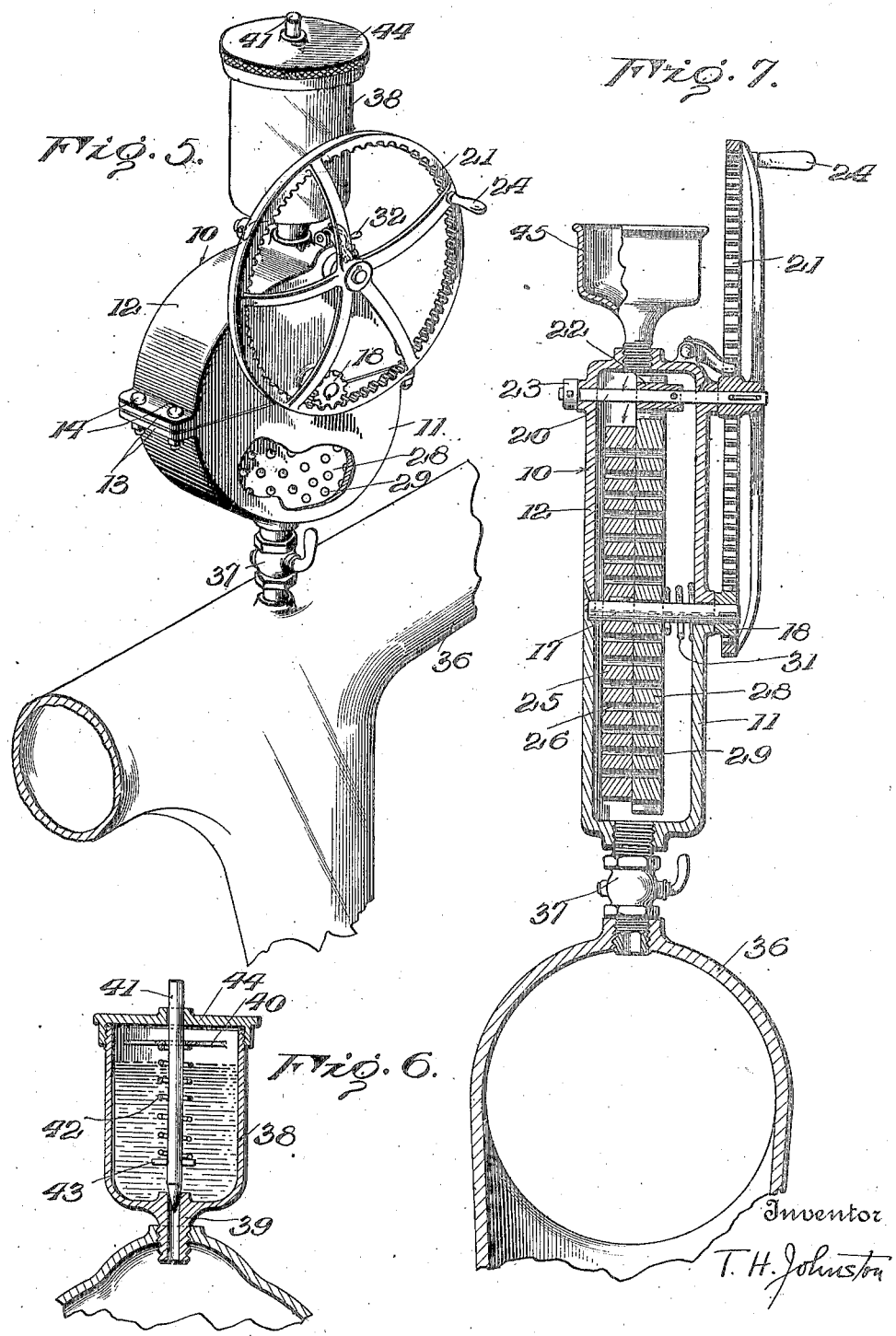

Patented Jan. 9, 1923.

1,441,809

UNITED STATES PATENT OFFICE.

THOMAS H. JOHNSTON, OF CLARENDON, VIRGINIA.

FUEL-CHARGE VAPORIZER FOR INTERNAL-COMBUSTION ENGINES.

Application filed August 23, 1918. Serial No. 251,196.

*To all whom it may concern:*

Be it known that I, THOMAS H. JOHNSTON, a citizen of the United States, residing at Clarendon, in the county of Alexandria and State of Virginia, have invented certain new and useful Improvements in Fuel-Charge Vaporizers for Internal-Combustion Engines, of which the following is a specification.

This invention relates to a process and apparatus for volatilizing fuel charges for combustion devices.

The invention has as one of its primary objects to provide a manually operable device for frictionally generating heat and imparting the heat so generated to an initial fuel charge for facilitating the starting of an internal combustion engine in cold weather.

The invention has as a further object to provide a fuel charge vaporizer including coacting friction discs disposed in the path of the fuel charge and adapted to be rotated one with respect to the other for heating the discs and vaporizing said charge prior to its admission into the engine cylinder.

And the invention has as a still further object to provide a construction wherein one of the discs will be yieldably supported in contact with the other so that there will be a corresponding constant frictional tension between the discs and wherein means will be provided for rotating the discs in opposite directions for overcoming the inertia of the discs at the time of starting said discs.

I am aware that it has been proposed to heat the fuel charge of internal combustion devices by successively impinging droplets or globules of fuel against several surfaces whereby the rapid vibration of the constituent molecules of the droplets or globules of fuel evolves heat but the herein-described invention differs from this method in that the heat is supplied to the fuel independent of the fuel as an agent for producing the heat.

Other and incidental objects will appear as the description proceeds. In the drawings, wherein I have illustrated the preferred embodiment of the invention, and wherein similar reference characters designate corresponding parts throughout the several views:

Figure 1 is a fragmentary sectional view showing my improved device interposed between the carbureter and intake manifold of a conventional type of internal combustion engine.

Figure 2 is a fragmentary front elevation of the device,

Figure 3 is a vertical sectional view showing the device on an enlarged scale,

Figure 4 is a plan view showing the friction discs in detail.

Figure 5 is a perspective view showing a modification of the invention wherein the device is mounted directly upon a manifold, Figure 6 is a fragmentary vertical sectional view showing the fuel reservoir employed in connection with the modification, and Figure 7 is a vertical sectional view on an enlarged scale showing a still further modification of the invention.

In carrying the invention into effect, I employ a preferably cylindrical casing 10 which may be formed of sheet metal or other suitable material and is split transversely into upper and lower sections 11 and 12 respectively. These sections are provided with mating ears 13 which receive bolts or other suitable fastening devices 14 detachably connecting the sections. Formed in the side walls of the upper section 11 are oppositely disposed openings or passages 15 and 16 respectively.

Journaled upon the casing axially thereof is a transverse shaft 17 received within suitable bearings formed at the junction of the casing sections. At its outer end this shaft is equipped with a pinion 18 fixed to the shaft. Formed on the lower side of the casing section 12 is a radial enlargement 19 and journaled through this enlargement is a transverse countershaft 20. The shaft 20 is received through suitable bearings at the ends of the enlargement and, at one end, has fixed thereto a drive gear 21. Within the enlargement, the countershaft carries a pinion 22 keyed or otherwise secured to the shaft, and holding the shaft against displacement is a collar 23 fixed to the inner end of the shaft. The gear wheel 21 is, as particularly shown in Figures 2 and 3 of the drawings, formed upon its inner face with gear teeth meshing with the pinion 18 and suitably connected with the said wheel is a handle 24 by which the wheel may be manually rotated.

Keyed or otherwise secured upon the shaft 17 within the casing, is a friction disc 25 which may be constructed of metal or other approved material. As shown in detail in Figure 4 of the drawings, this disc is provided throughout the major portion of its area with a plurality of relatively small apertures 26 and formed through the disc, adjacent its periphery, is an opening 27 of a diameter equal to that of each of the openings 15 and 16 and adapted to register therewith. Freely mounted upon the drive shaft to frictionally contact with the disc 25 is a second friction disc 28 of a diameter slightly greater than that of the former disc. Like the disc 25, this disc 28 is provided throughout the major portion of its area with a plurality of relatively small apertures 29 and formed through the disc, adjacent its periphery, is an opening 30 corresponding to the opening 27 in the disc 25 and adapted to register therewith and with the openings 15 and 16 in the casing. At its periphery the disc 28 is provided with gear teeth meshing with the pinion 22 upon the countershaft 20 so that said disc will be rotated from this shaft, and bearing between the disc and the adjacent side wall of the casing is a helical spring 31 surrounding the drive shaft 17 and acting to yieldably hold the disc 28 in frictional contact with the disc 25.

As will now be seen, rotation of the gear wheel 21, say, for instance, in a clockwise direction, will act through the pinion 18 upon the drive shaft 17, to turn the disc 25 in a direction with the gear wheel. On the other hand, the pinion 22 upon the countershaft 20 will act through the gear teeth at the periphery of the disc 28 to rotate this disc in a counterclockwise direction. The discs will thus be oppositely rotated upon movement of the gear wheel and, as will be well understood, this construction provides an arrangement whereby the inertia of the discs may be readily overcome when initially starting the discs. Mounted upon the enlargement 19 of the casing section 12 is a plane with the countershaft 20, is a suitable spring pressed latch 32, the pawl of which is movable to engage within a notch 33 formed in the hub of the wheel 21. The notch is so disposed upon the wheel hub that when brought into position for receiving the pawl of the latch, the openings 27 and 30 in the friction discs will be moved into register with each other as well as into register with the openings 15 and 16 in the casing. Thus, the gear wheel may be locked in such position that these several openings will form an unobstructed passage through the casing.

In Figure 1 of the drawings, I have, in order that the mounting and operation of my improved device may be clearly understood, shown the device mounted in active position between a conventional type of carbureter 34 and the intake manifold 35 of a conventional internal combustion engine. As shown in this figure, the casing is disposed with the openings 15 and 16 registering respectively with the outlet passage of the carbureter and the passage of the manifold, the device being secured in position by bolts or other suitable fastening devices extending through the side walls of the casing and the usual ears formed on the respective terminals of the carbureter passage and the manifold. Thus, it will be seen that the device may be readily secured in place without the necessity for any change in the engine manifold or in the carbureter, and, as will now be clear in view of the preceding description, uninterrupted communication between the carbureter and the manifold will normally be established by the registering openings 27 and 30 of the discs so that when the device is not being actually operated, the flow of fuel mixture from the carbureter through the manifold, will be unhampered. However, should difficulty be experienced in starting the engine, the latch 32 is released when the hand wheel 21 is then rotated for rubbing the friction discs against each other. These discs will accordingly become heated and may, if desired, be heated quite hot. After having thus heated the friction discs, the wheel 21 is stopped at some point with the notch 33 of the hub thereof out of alinement with the pawl of the latch so that the openings 27 and 30 in the discs will be out of register. The discs will thus be caused to block communication between the carbureter and manifold. Then, when the engine is started and suction accordingly created in the manifold for drawing up a charge of fuel mixture from the carbureter, the fuel charge will be caused to take a circuitous course through the casing, first striking the disc 25 to then flow over and around this disc as well as over and around the disc 26 to finally flow up through the manifold. At the same time, the fuel charge will also flow through such of the openings 26 and 29 in the discs as are in register. Thus, the fuel charge will be brought into intimate contact with the major portion of the area of the discs and will accordingly be heated and vaporized thereby so that upon being drawn into the cylinders of the engine, ignition will readily take place. Having started the engine, the wheel 21 is turned to its normal position and latched against movement. I accordingly provide a highly effective construction for the purpose set forth and a device which, owing to its simplicity, is well adapted for general use. Furthermore, by generating heat for vaporizing the fuel charge by means of the friction discs employed, liability of premature ignition of the charge, such as exists in devices of the well known type employing an electrical resistance element for a similar purpose, is eliminated. In this connection, it should be stated that any approved selection of materials employed to form the discs, may be made with a view to reducing to a minimum the possibility of the creation of a static spark between the discs.

In Figures 5 and 6 of the drawings I have illustrated a slight modification of the invention wherein the device is adapted to be mounted directly upon an engine intake manifold, such a manifold being conventionally indicated at 36. In this modification the casing is constructed as in the preferred form of the invention with the exception that the openings 15 and 16 disclosed in connection with the preferred construction, are eliminated. The friction discs employed are also mounted and operated in a manner similar to the discs of the preferred form of the invetnion. However, in this modification the openings 27 and 30 in the discs are eliminated. Threaded at one end into the lower portion of the section 11 of the casing is a shut off valve 37, the opposite end of which is adapted to be tapped into the manifold 36 for thus operatively mounting the device upon the manifold. As shown in Figure 5, the device is preferably mounted upon the manifold above its trunk to upstand from the manifold. Mounted upon the casing is an upstanding fuel reservoir 38. This reservoir is provided with an outlet nipple 39 threaded into the enlargement 19 of the section 12 of the casing and, as shown in Figure 6 of the drawings, said nipple is formed at its inner end with a suitable valve seat. Fixed within the reservoir adjacent its upper extremity is a spider 40 and slidable through this spider is a valve 41, the lower end of which is tapered to engage the valve seat for closing the outlet from the reservoir. Surrounding the valve is a helical spring 42 bearing between the spider and a pin 43 carried by the stem for yieldably holding the valve closed. Threaded upon the upper end of the reservoir is a closure cap 44 freely receiving the valve therethrough. The reservoir 38 is, of course, designed to contain a quantity of liquid fuel. Thus, after the wheel 21 has been operated for heating the friction discs, the valve 37 may be opened and the valve 41 momentarily lifted for admitting a charge of fuel into the casing to flow over the heated discs. The fuel charge will accordingly be vaporized within the casing to then be drawn into the manifold to the engine cylinders when ignition will readily occur. Under ordinary circumstances, the valve 37, as well as the valve 41, is, of course, maintained closed.

In Figure 7 of the drawings, I have illustrated a still further modification of the invention. This latter modification is substantially identical with the modification shown in Figures 5 and 6 of the drawings with the exception that a priming cup 45 is employed in lieu of the fuel reservoir 38 of the prior modification, for introducing a charge of fuel into the casing.

Having thus described the invention, what is claimed as new is:

1. The combination with an internal combustion engine, of a charge-forming device, and means for frictionally generating heat independently of the fuel and of combustion heat for initially heating the fuel charge.

2. In combination with an internal combustion engine having charge-forming means, coacting friction elements, means for holding said elements in contact with each other, and means for operating the friction elements to generate heat independent of the fuel as an agent for producing the heat whereby a fuel charge subjected to the influence of the heated friction elements will be volatilized.

3. The combination with an internal combustion engine having a charge-forming device, of means for frictionally generating heat independently of the fuel charge as an agent for producing the heat thereby to volatilize said charge previous to admission to the engine cylinder.

4. In combination with an internal combustion engine having charge-forming means including a casing, coacting friction elements mounted for rotation in opposite directions within the casing, and means for operating said elements to generate heat, independent of the fuel as an agent for producing said heat whereby a fuel charge passing through the casing and subjected to the influence of the heated friction elements will be volatilized.

5. In combination with an internal combustion engine having charge-forming means including a casing, coacting solid friction elements mounted therein, means for rubbing one of said elements against another to produce heat for volatilizing a fuel charge passing through the casing, and means urging adjacent friction elements into contact with each other.

6. In combination with an internal combustion engine having charge-forming means including a casing, coacting perforated friction elements mounted for rotation in contact with each other within said casing, and means for moving one of said elements relative to the other to produce heat to volatilize a fuel charge passing through said perforations and casing.

7. In combination with an internal combustion engine having charge-forming means including a casing, coacting friction elements having flat contact faces mounted in said casing, means for simultaneously moving the elements in opposite directions to heat the same, and means for directing a fuel charge against the heated elements to volatilize said charge.

8. In an internal combustion engine the combination with a carburetor and manifold, of a friction heat generator disposed in the path of the fuel from the carburetor and including coacting friction elements having flat contact faces and means for operating the elements to heat the same, whereby a fuel charge coming in within the zone of heat generated by said elements will be vaporized.

9. A friction heat generator for internal combustion engines including a casing, a driven shaft rotatably mounted therein, a friction element fixed to the shaft and having a flat face, a friction element freely mounted on the shaft and having a flat face to coact with the flat face of said first mentioned element, and manually operable means coupled with the second mentioned element and operably engaging said shaft for simultaneously rotating the elements in opposite directions to heat the same.

10. A friction heat generator for internal combustion engines including a casing, a driven shaft journaled therein, a friction element fixed to said shaft, a friction element freely mounted upon the shaft to coact with the first mentioned element and formed at its periphery with gear teeth, a countershaft journaled within the casing, a pinion upon said countershaft engaging the gear teeth, a pinion upon the driven shaft, and a drive gear fixed to the countershaft and engaging the second mentioned pinion, the drive gear being operable for simultaneously rotating the elements in opposite directions to heat said elements.

11. The herein-described process of volatilizing a fuel charge for an internal combustion device consisting of frictionally generating heat independently of the fuel as an agent for producing said heat and conveying the heat thus generated to the charge to be volatilized.

12. The herein-described process of volatilizing a fuel charge for an internal combustion engine consisting in heating the fuel by rubbing friction members together and passing the fuel into contact with at least one of said members.

13. The herein-described process of volatilizing a fuel charge for an internal combustion engine consisting in rubbing friction members together to heat the same and subjecting the fuel charge to the influence of the heat produced by said friction elements.

In testimony whereof I affix my signature.

THOMAS H. JOHNSTON. [L. S.]